US007199387B2

(12) United States Patent
Lampersberger

(10) Patent No.: US 7,199,387 B2
(45) Date of Patent: Apr. 3, 2007

(54) APPARATUS AND METHOD FOR DETECTING A PREDETERMINED PATTERN ON A MOVING PRINTED PRODUCT

(75) Inventor: Franz Lampersberger, Aschheim (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 131 days.

(21) Appl. No.: 11/042,564

(22) Filed: Jan. 25, 2005

(65) Prior Publication Data

US 2005/0169528 A1 Aug. 4, 2005

(30) Foreign Application Priority Data

Jan. 25, 2004 (DE) ...................... 10 2004 003 614

(51) Int. Cl.
*G01N 21/86* (2006.01)

(52) U.S. Cl. ............................ 250/559.44; 250/559.04

(58) Field of Classification Search .............................. 250/559.44–559.46
See application file for complete search history.

(56) References Cited

U.S. PATENT DOCUMENTS 5,665,950 A * 9/1997 Rottner et al. ......... 235/462.05
5,724,259 A 3/1998 Seymour et al.

FOREIGN PATENT DOCUMENTS

DE 195 38 811 C2 11/1996
DE 102 08 286 A1 9/2003
WO WO 03/073084 A1 9/2003

* cited by examiner

*Primary Examiner*—Thanh X. Luu
(74) *Attorney, Agent, or Firm*—Leydig, Voit & Mayer, Ltd.

(57) ABSTRACT

An apparatus and method for detecting a relatively narrow predetermined pattern, such as a trigger mark, on a moving printed product uses a plurality of sensor elements arranged linearly in an array and a switching apparatus for selecting a properly located subset of the sensor elements for detecting the predetermined pattern. During the operation of the apparatus, only those signals from sensors in the selected subset are checked continuously for the occurrence of a signal pattern corresponding to the predetermined pattern. Each time the predetermined signal pattern is found in the output signal from a sensor within the selected subset, a detection signal is generated. The lateral shifting of the predetermined pattern over time may be monitored by the selected sensors, and the selection of the subset of sensors for the continuous evaluation may be changed in response to the lateral shifting.

23 Claims, 3 Drawing Sheets

APPARATUS AND METHOD FOR DETECTING A PREDETERMINED PATTERN ON A MOVING PRINTED PRODUCT

FIELD OF THE INVENTION

This invention relates to an apparatus and method for detecting a predetermined pattern on a moving printed product, and more particularly to an arrangement of optical sensor elements for detecting a predetermined pattern, such as trigger mark, on a moving printed product.

BACKGROUND OF THE INVENTION

DE 102 08 286 A1 discloses an electronic image evaluation device and an evaluation method in which a printed product is conveyed past the device and, during its movement, images of predetermined extracts of the printed product are acquired and evaluated. In order to trigger the image acquisition at the respectively correct time, a sensor is provided which outputs a synchronization signal when it detects a predetermined reference marking on the printed product. The extracts of the printed product to be acquired have known positions in relation to the reference marking, so that the correct triggering time for the image acquisition can be determined by using the synchronization signal and the known speed of the printed product. However, the aforementioned specification contains no more specific statements relating to the implementation and internal functioning of the sensor in question.

A typical example of an extract of a printed product to be acquired optically and evaluated within a press is a control strip arranged outside the subject and printed with test patterns. Such control strips, whose longitudinal direction is normally transverse to the transport direction of the printing material, contain a set of measuring areas that are repeated periodically in the aforesaid longitudinal direction, and on each measuring area a specific characteristic variable characterizing the printing quality can be measured. One example of the configuration and use of such a control strip is given by DE 195 38 811 C2. In order to minimize the consumption of printing material, attempts are made to keep control strips of this type as narrow as possible. Consequently, the area required for the reference marking needed for the synchronization of the image position with the movement of printing material, which will be designated the "trigger mark" in the further text, should also be as small as possible.

On the other hand, during the movement of the printing material in a press, position tolerances in the lateral direction must be expected. In particular, in the case of work-fed rotary machines, the lateral deviation of the printing material web from its intended position within the aforesaid web length in the machine can amount to some centimetres. In order to ensure that a trigger mark can be registered by a sensor arranged at a specific lateral position even in the least favourable case of a lateral position or deviation of the printing material web, a trigger mark would therefore have to have a considerable width covering the entire tolerance range. However, this is inconsistent with the endeavour previously mentioned to have the smallest possible area required for the pattern to be provided outside the subject merely for control purposes.

BRIEF SUMMARY OF THE INVENTION

In view of the foregoing, it is an object of the invention to provide an apparatus and method with which a predetermined pattern of small dimensions on a moving printed product can be detected reliably in spite of any possible lateral position deviation of the printing material, and its occurrence can be signalled with precise timing.

The apparatus according to the invention is distinguished by the fact that it has a plurality of sensor elements arranged linearly beside one another, and also a switching apparatus by means of which a selectable subset of sensor elements can be connected to an evaluation unit. In the case of a trigger mark whose width must be substantially less than the tolerance range of the lateral position of the printing material in the press, this always permits the specific selection from the sensor elements of those whose positions are the most beneficial in relation to those of the trigger marks on the printing material for the purpose of evaluating their output signals. This means that, instead of a wide trigger mark, a wide sensor arrangement is used which, however, is used only to the extent of part of its full width, in order to keep the expenditure on hardware and/or time for reading and processing the sensor signals low.

Since the time profile of the output signals from the sensors registering a specific geometric pattern of the trigger mark depends on the speed of movement of the printing material, a speed reference is needed for pattern recognition. This may be expediently supplied to the evaluation unit for its digital functioning in the form of a clock signal that, in a simple way, can be generated by an incremental encoder fitted to a cylinder of the press.

The subset of sensor elements selected for the evaluation is generally a locally contiguous group that preferably includes three successive sensor elements. These sensor elements are selected in such a way that the central sensor is the optimally placed one. The two outer ones can be used for the purpose of detecting lateral movement of the trigger mark over time before it has moved away from the detection region of the previously optimal sensor. This allows the shifting of the selection of the subset of sensors within the sensor arrangement in the direction of the drift of the trigger mark so as to track the position of the subset to that of the trigger mark.

In order to select the subset of sensors for detecting the trigger mark, at least one multiplexer may be used. However, it is advantageous to provide as many multiplexers as the number of sensors in the selected subset, and to connect an analog/digital converter with an equal number of parallel channels downstream thereof, in order to convert the signals of all the channels of the selected sensors simultaneously to enable high speed data acquisition.

It is also advantageous for the clock signals supplied externally as the speed reference of the printed product to be used for clock generation for the signal acquisition components, in order to record a constant number of scanned values per unit length irrespective of the speed of the printed product. In this way, the memory space required per unit length in the memory provided for the buffering of the digitized sensor signals before the comparison with a predetermined signal pattern remains constant, irrespective of the speed of the printed product. This simplifies the operation of this signal memory.

In order to permit universal adaptation to any desired trigger mark, the signal pattern with which the scanned sensor signals are compared should be externally predefinable, which requires an appropriate interface for communication with a higher-order control device.

The method according to the invention observes the printed product by means of a linear sensor arrangement and detects the occurrence of the trigger mark by using a characteristic signal profile in a subset of the sensors, of which only one sensor from the subset is the deciding factor in the output of a detection signal indicating the detection of a trigger mark. In the event of lateral movement of the printed product and consequently the position of the trigger mark, in order to track the sensor subset used in an appropriate manner and always to keep the trigger mark in the active observation range of the sensor arrangement, the output signals from the aforesaid subset of sensors is monitored for changes among one another in accordance with predetermined criteria, and the subset is changed if sufficient indications of lateral movement become visible.

At the start of the operation of the press when no subset of the sensors has yet been selected, sensor elements whose lateral positions lie in the region of the trigger mark on the printed product have to be looked for by checking their output signals for a pattern characteristic of the trigger mark. In this regard, it is advantageous if the spacing of the sensor elements is matched to the width of the trigger mark in such a way that two successive sensors can detect the trigger mark fully, because in such a case three successive sensors properly selected should be sufficient for detecting the trigger mark. In this case, the multiplicity of the sensors in the aforesaid subset should be three, and the position of the sensor subset in relation to the trigger mark and, in particular, lateral drifting of the movement path of a printed product and the trigger mark thereon away from the observation range of the currently active sensor subset, can be determined promptly by using a statistical comparison of the signal quality.

Here, the statistical comparison can be carried out in a simple manner by the frequency of detection of the trigger mark within a predetermined movement distance of the printed product, since a marginal position of a sensor in relation to the trigger mark as compared with a central position results in a poorer signal quality, which permits its detection only intermittently rather than during each occurrence. In this case, one advantageous measure of the movement distance is provided by a clock signal whose frequency is proportional to the speed of movement of the printed product, since the measurement of the distance then changes into the counting of clock edges.

Then, if the maximum of the frequency distribution of the detections within the sensor subset selected for the evaluation is displaced in a specific direction, this is a clear indication of a corresponding lateral displacement of the trigger mark. Beginning at a certain extent, namely at the latest when a sensor within the selected subset has reached the highest detection frequency in the marginal position, this requires shifting the sensor subset selected for the evaluation by one sensor in the same direction. Another indication of such a displacement can be the detection rate of one of the sensors of the subset in the marginal position falling below a predetermined threshold.

In order to detect the trigger mark by seeking a corresponding predetermined signal pattern in the output signal of a sensor, initially a signal edge of a predetermined minimum height with a predetermined minimum length of the high and low signal level is used in addition to the edge as an indicator of the start of the aforesaid signal pattern. Once this start has been detected, then further edges are looked for at predetermined intervals in relation to the first edge, in each case with a certain tolerance window. Here, it is expedient to adapt the threshold for the detection of an edge continuously to the printed ink density by calculating the threshold from the intensity values actually measured by the sensors of the light reflected from an unprinted and a printed region. The last edge of the signal pattern can then be used directly as a timing reference point in the generation of a detection signal, so that the latter can be output with the minimum possible delay and without jitter.

The evaluations of the output signals from the sensors of the selected subset for detecting the lateral movement of the movement path of the printed product are less time-critical than the evaluation of the sensor signals for deriving the detection signal, which is to be performed without any delay if possible. In practice, it is sufficient if all the sensor signals are evaluated, the frequency statistics are updated and, if necessary, a shifting of the active sensor subset is carried out, before the next occurrence of the trigger mark. It is therefore expedient to evaluate the less time-critical sensor signals with a time offset, since in this way duplication of the hardware needed for the evaluation is avoided.

The same speed-proportional clock signal which is used in the frequency statistics for measuring a movement distance of the printed product can also be advantageously used to derive a clock for the digitization of the sensor signals. In this way, two successively digitized signal values have a constant local spacing on the printed product, irrespective of the speed of movement of the latter, so that the entire signal processing, including particularly the comparison of the sensor signals with the signal pattern corresponding to the trigger mark, remains completely independent of the speed of movement. Of course, this concept assumes that the resultant clock rate for the digitization does not overtax the maximum operating speed of the hardware components involved, in particular that of the analog/digital converter.

In the following text, an exemplary embodiment of the invention will be described by using the drawings, in which:

DETAILED DESCRIPTION OF THE INVENTION

Figure 1:
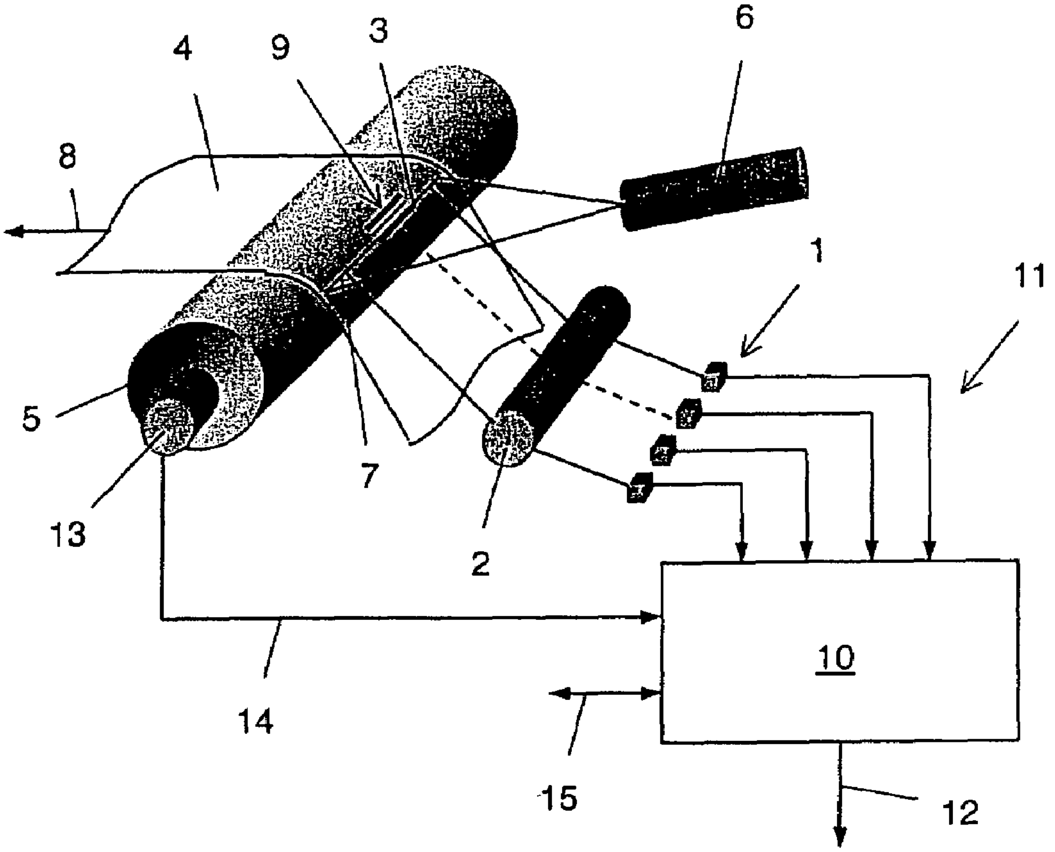
FIG. 1 shows a schematic perspective view of the arrangement of the optical components of an apparatus according to the invention.

As FIG. 1 shows, an apparatus according to the invention has an arrangement 1 comprising a plurality of optoelectronic sensors, which are arranged linearly beside one another in a fixed spacing grid. The sensor arrangement 1 can be an arrangement 1 of discrete photodiodes on a printed circuit board, but also an integrated line sensor 1. In the case of the latter, there must be the possibility of reading the individual sensor elements in parallel, in order that a sufficiently high data rate can be achieved. By means of imaging optics 2 in the form of a cylindrical lens whose axis runs parallel to the line defined by the arrangement of the sensors 1, a narrow strip 3 of a printed product 4 is projected onto the sensor arrangement 1.

In order to maintain a constant distance from the lens 2 and the sensor arrangement 1, the printed product 4 is tensioned over a roller 5, whose axis is likewise parallel to the sensor arrangement 1. The roller 5 is a deflection roller 5 in a press, and the axis of the roller 5 predefines the reference direction, at which the sensor arrangement 1 and the imaging optics 2 are aimed when they are mounted in the press.

The strip 3 on the printed product 4 is illuminated by a light source 6 which has a virtually linear illumination characteristic and which, for example, can be formed by what is known as a linear laser, which is a laser diode with optics connected in front in order to spread out the beam in a single direction. Light sources 6 of this type are known and available as such. The illumination line 7 is likewise parallel to the axis of the roller 5 and traverses the observation strip 3 of the sensor arrangement 1 on the printed product 4 completely in the longitudinal direction.

Printed on the printed product 4 at regular intervals along its direction of movement, indicated in FIG. 1 by the arrow 8, are trigger marks 9 in the form of a pattern of lines, just one of which is located in the observation strip 3 of the sensors 1 in FIG. 1. These trigger marks 9 are intended to be detected in a signal processing device 10, to which the sensors 1 are connected via sensor leads 11. The signal processing device 10 in this case outputs on a trigger line 12 a detection signal which is provided in order to trigger the electronic acquisition of an image of a control strip extending outside the subject on the printed product 4, on which characteristic variables of the printing quality are to be determined. Since the trigger mark 9 has a known spacing in the direction of movement 8 from the control strip or is preferably itself arranged inside this control strip, chronological synchronization of the triggering is made possible by using the detection signal. In the case of sheet-fed printing, the regular spacing of the trigger marks 9 is to be understood such that there is at least one thereof on each sheet.

In order to register the rotational angle, an incremental encoder 13 is arranged on the roller 5 and outputs a clock signal with a clock frequency which is proportional to the rotational speed of the roller 5 and which is supplied to the signal processing device 10 via a clock line 14. The frequency of the clock signal is a measure of the speed of movement of the printed product 4. On the other hand, irrespective of the aforesaid speed of movement, a section of constant length of the printed product 4 always passes the illumination line 7 in every clock period.

The important communication paths of the signal processing device 10, apart from the sensor leads 11, the trigger line 12 and the clock line 14, further include a data line 15, via which a signal pattern, which is intended to be compared with the sensor signals present on the sensor leads 11, can be transmitted to the signal processing device 10. The aforesaid signal pattern can be predefined externally via the data line 15 by a higher-order control device, and in this way adapted to any desired geometric pattern of the trigger mark 9 on the printed product 4. The signal processing device 10, together with the sensor arrangement 1, the imaging optics 2 and the light source 6, is arranged in a common housing, which is mounted as a whole in a press in a suitable alignment with the roller 5. This housing is not illustrated in FIG. 1, for reasons of clarity.

Figure 2:
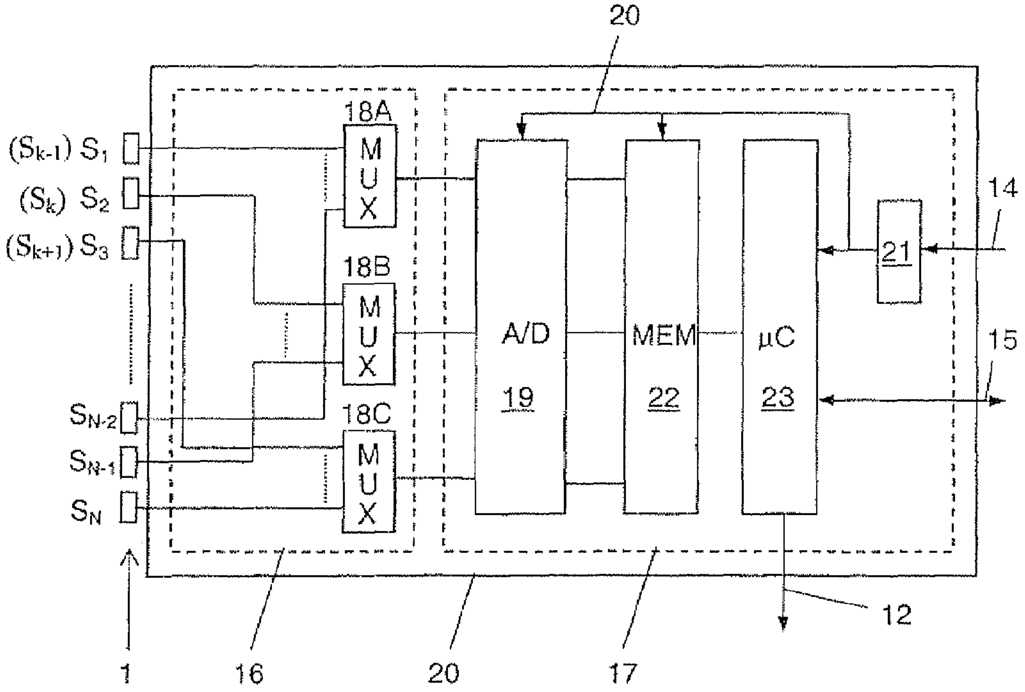
FIG. 2 shows a block diagram of an apparatus according to the invention.

FIG. 2 shows a block diagram of the electronic signal processing device 10. As can be seen from this, the signal processing device 10 is substantially composed of a switching apparatus 16 and an evaluation unit 17. The optoelectronic sensor arrangement 1 is connected to the switching apparatus 16. There are a total of N sensors, which are numbered $S_1$ to $S_N$.

Each of the sensors $S_1$ to $S_N$ is connected to an input of one of three multiplexers 18A, 18B or 18C, three contiguously consecutive sensors $S_{k-1}$, $S_k$ and $S_{k+1}$ always being connected in each case to one of three different multiplexers 18A, 18B or 18C and the assignment of the sensors $S_1$ to $S_N$ to the multiplexers 18A, 18B and 18C being cyclically regular. For example, the sensor $S_1$ is connected to the first input of the multiplexer 18A, the sensor $S_2$ is connected to the first input of the multiplexer 18B and the sensor $S_3$ is connected to the first input of the multiplexer 18C. The next sensor $S_4$ is connected to the second input of the multiplexer 18A, the sensor $S_5$ to the second input of the multiplexer 18B, and so on. Of the three last sensors, $S_{N-2}$, $S_{N-1}$ and $S_N$, each is connected to the respective last input of one of the multiplexers 18A, 18B or 18C. By means of appropriate addressing of the multiplexers 18A, 18B and 18C, it is thus possible for the output signals of three different sensors to be connected through to the evaluation unit 17 in parallel with one another. As will be explained in more detail further below, these are always the output signals of sensors $S_{k-1}$, $S_k$ and $S_{k+1}$ lying contiguously beside one another. Given the wiring described previously, the latter is effected by standardized addressing of the three multiplexers 18A, 18B and 18C.

The outputs of the three multiplexes 18A, 18B and 18C are connected to the inputs of a three-channel analog to digital converter 19. This A/D converter 19 is supplied via a clock line 20 with a clock signal which is derived in a clock generator 21 belonging to the evaluation unit 17 from a clock signal supplied by the incremental encoder 13 on the clock line 14. The conversion rate of the A/D converter 19 and thus the data rate and its output, is therefore proportional to the speed of movement of the printed product 4. Two successive output data values from a channel of the A/D converter 19 therefore correspond to the light intensities which the sensor currently connected to the channel has measured at two different points on the printed product 4, which are located at a predetermined distance from each other along the direction of movement. In this case, this distance does not depend on the speed of movement, since the clock rate on the lines 14 and 20 follows a change in the speed proportionally.

The evaluation unit 17 also contains a signal memory 22, into which the output data from the A/D converter 19 can be written. Large memory areas of the same size are provided for the respective channels of the A/D converter 19. Each of these memory areas is organized as a ring buffer that is written cyclically in such a way that the data value respectively stored at the address which has not been written for the longest time is overwritten with a new data value. Writing to the signal memory 22 is necessarily carried out at the same rate at which the data are supplied by the A/D converter 19, for which purpose the clock line 20 is also led to the signal memory 22.

The signal waveforms deposited in the signal memory 22 are checked by a microcontroller 23 for the presence of a predetermined signal pattern. In this case, the microcontroller 23 only reads from the signal memory 22, while the writing to the signal memory 22 is carried out directly from the A/D converter 19 using direct memory access (DMA) operation. The predetermined signal pattern is transmitted to the microcontroller 23 via a data line 15 at the start of operation and stored there in an internal memory. The microcontroller 23 also controls the multiplexers 18A, 18B and 18C, the address lines from the microcontroller 23 to the multiplexers 18A, 18B and 18C not being shown in FIG. 2 for reasons of clarity.

By means of the previously described clocked acquisition of the data written into the signal memory 22, the basic clock supplied by the clock generator 21 necessarily forms a grid for the analysis of the signal form, in that the value of the signal can change only at the clock edges. The method by which this analysis of testing for agreement with the stored predetermined pattern is carried out by the microcontroller 23 will be explained below using FIG. 3.

Figure 3:
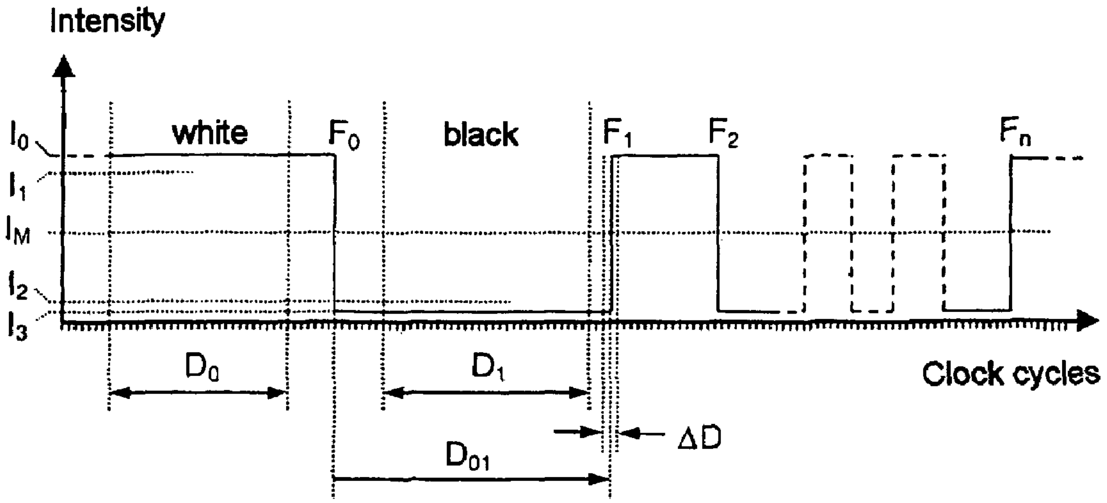
FIG. 3 shows a part of the waveform of a sensor signal intended to be recorded and processed by the apparatus according to the invention.

FIG. 3 illustrates an exemplary waveform of a signal indicating the light intensity measured by a single sensor, with the clock cycles of the data acquisition marked along the abscissa. As can be seen from FIG. 3, the signal in the section considered begins with a light intensity $I_0$ which corresponds to a white (i.e., unprinted) area on the printed product 4. At an edge $F_0$ the intensity falls back abruptly to the substantially lower value $I_3$. This corresponds to a black printed area on the printed product 4. At a further edge $F_1$ the intensity springs back to the value $I_0$ again, then to the value $I_3$ again at an edge $F_2$. After several further pulses bounded by positive and negative edges, which are only indicated dashed in FIG. 3, there follows a last-flank $F_n$, after which the signal then remains at the intensity $I_0$ for a long time.

The predetermined pattern with which a signal is compared begins with a single white-black transition in the form of a negative signal edge. In this case, a white phase of predetermined minimum length $D_0$ must be followed by a black phase of predetermined minimum length $D_1$. As long as the start of the pattern has still not yet been found, a signal level above a first threshold $I_1$ is viewed as the colour white, while a signal level below the second threshold $I_2$ is considered to be the colour black. After the edge $F_0$ has been found, the arithmetic mean $I_M$ of the actual signal levels $I_0$ and $I_3$ of the colours white and black is defined as a threshold above which the signal is assigned the colour white, while below it the said signal is assigned the colour black.

Starting from the edge $F_0$, a search is then made for further edges $F_1$, $F_2$ and so on up to $F_{n-1}$, of which each must be located at a predetermined distance from the first edge $F_0$. For example, the edge $F_1$ must have the spacing $D_{01}$ from the edge $F_0$. However, in the case of each edge, a specific tolerance $\Delta D$ of the distance from the first edge $F_0$ is permissible. If all the edges $F_1$ to $F_{n-1}$ are respectively located at the correct distance from the first edge $F_0$, then the pattern looked for is present. The predetermined sequence of edges in the sensor signal corresponds to the agreement between the trigger mark 9 on the printed product 4 with a bar code of predefined bar widths and spacings.

After the presence of the pattern looked for has already been fixed at the edge $F_{n-1}$, the evaluation unit is able to output the detection signal on the trigger line 12 without any delay in the event of the detection of the next edge $F_n$, without any further testing. Jitter in the detection signal is avoided in this way. The edge $F_n$ thus forms the chronological reference point for the output of the detection signal on the trigger line 12. Although there is still an unavoidable delay between the occurrence of the last black-white transition of the trigger mark 9 in the observation strip 3 of the sensors 1 and the output of the detection signal, the said delay depending on the processing speeds of the A/D converter 19, the signal memory 22 and the microcontroller 23, the extent of this delay is constant.

If required, the detection signal could also be generated only with a precisely defined time interval from the edge $F_n$. Since the evaluation unit 17 is able to infer the movement of a trigger mark 9 found on the printed product 4 by using the clock signal supplied on the clock line 14 by the incremental encoder 13, it is possible to output the detection signal specifically with a time offset when the trigger mark 9 has covered a predetermined distance from the observation strip 3 of the sensors 1.

In order that the detection of the trigger mark 9 can be ensured in the event of lateral movement of the printed product 4 from its envisaged movement path, even when a relatively narrow trigger mark 9 is used, a plurality of sensors $S_1$ to $S_N$ are arranged linearly beside one another, and three-channel acquisition and evaluation of the sensor output signals is provided. The width of the trigger mark 9 and the distance between the sensors $S_1$ to $S_N$ are coordinated with each other in such a way that at least two successive sensors $S_k$ and $S_{k+1}$, can always register the trigger mark simultaneously.

At the time of commissioning the apparatus according to the invention, it is initially not yet known which of the sensors $S_1$ to $S_N$ have the correct lateral position in order to be able to register the trigger mark 9. Therefore, by means of the multiplexers 18A, 18B and 18C, various groups of three $S_{k-1}$, $S_k$, $S_{k+1}$ of adjacent sensors are selected one after another and connected to the A/D converter 19. The microcontroller 23 looks for the predetermined signal pattern in the signal waveforms of the respectively connected group of three $S_{k-1}$, $S_k$, $S_{k+1}$ in accordance with the method described previously using FIG. 3. If the signal pattern has not been found within a specific number of clock cycles, then other sensors $S_1$ to $S_N$ are selected. In this case, for example, it is possible to start from an approximately central sensor $S_m$ and its not yet checked and respectively closest neighbours are checked progressively in the order $S_m$, $S_{m-1}$, $S_{m+1}$, $S_{m-2}$, $S_{m+2}$ and so on until the signal pattern has been found.

If the signal pattern has been found at a specific sensor $S_k$, then its not yet checked neighbours are checked until a group of three is found within which at least two sensors supply output signals in which the signal pattern occurs. Under the assumption previously mentioned of appropriate coordination of the sensor grid spacing and the width of the trigger mark 9, this must always be possible. In this case, a sensor $S_k$ will generally be located most beneficially in relation to the trigger mark 9 and, upon each occurrence of the trigger mark 9 in its output signal, the signal pattern corresponding to the trigger mark will be detected by the evaluation unit 17. In the case of the adjacent sensors $S_{k-1}$ and $S_{k+1}$, a poorer quality of the output signals with regard to the agreement with the signal pattern is to be expected, so that the trigger mark 9 will not be detected upon each occurrence. In this case, there will normally also be an inequality in the signal quality between the two sensors $S_{k-1}$ and $S_{k+1}$.

The multiplexers 18A, 18B and 18C are then addressed in such a way that the sensor $S_k$ with the best position is assigned to the central channel, running via the multiplexer 18B. The sensor $S_{k-1}$ is assigned via the multiplexer 18A to the upper channel, and the sensor $S_{k+1}$ is assigned via the multiplexer 18C to the lower channel. In this case, the determination of the rank of the sensors is carried out by using frequency statistics relating to the detection of the trigger mark 9. Each channel is assigned a counter which counts the number of detections on the respective channel. Since the number of detections is related to a predetermined number of revolutions of the roller 5, which can be derived from the clock signal of the incremental encoder 13, a criterion for the current detection quality of each channel can be specified.

Otherwise, from the spacing, measured in clock cycles, covered by successive detections on the currently best channel, it is possible to predict the respective next detection, since the spacing at which the trigger mark 9 occurs on the printed product 4 is constant. To this extent, for the frequency statistics after the finding of a sensor which has detected the trigger mark 9 repeatedly successively, a reference variable can be derived from the previous history. In this case, the number of actual detections within a predetermined number of revolutions of the roller 5 is placed in a relationship with the number of detections to be expected in this number of revolutions.

Then, if the printed product 4 moves laterally out of its envisaged movement path in the machine, the corresponding lateral displacement of the trigger mark 9 leads to a change in the result of the aforesaid frequency statistics. Firstly, from the two sensors $S_{k-1}$ and $S_{k+1}$ adjacent to the originally optimally placed sensor $S_k$, that one towards which the trigger mark 9 moves will exhibit an increasingly better signal quality, and the respective other one will exhibit an increasingly poorer signal quality of the signal pattern looked for, which leads to correspondingly more frequent or less frequent detection of the signal pattern.

For instance, if it is assumed that the trigger mark 9 moves out in the direction of the sensor $S_{k+1}$, then this sensor will catch up with the originally best sensor $S_k$ at some time in the frequency statistics of the detection. In this case, by means of the multiplexers 18A, 18B and 18C, the group of selected sensors will be changed to the effect that the sensor $S_{k-1}$ is switched off and the sensors $S_k$, $S_{k+1}$ and $S_{k+2}$ will now be connected through, the sensor $S_{k+1}$ being assigned to the central channel.

The microcontroller 23 is able to check the signal waveforms converted in parallel by the A/D converter 19 and stored in the signal memory 22 only sequentially for agreement with the predetermined signal pattern. In order to keep the unavoidable delay of the earliest possible output of the detection signal as a result of the finite operating speed of the microcontroller 23 as low as possible, of the three signal waveforms stored in the signal memory 22 in expectation of the next occurrence of the signal pattern, the signal variation from the central channel, which is assigned to the currently best sensor, is always checked first by the microcontroller 23. If the signal pattern has either been detected there or has remained absent for longer than expected, the two other channels are then checked one after another, the expectation of the signal pattern referring to the previously mentioned prediction of its spacing from the last occurrence by using its spacings in previous detections.

The output of the detection signal is always determined solely by the central channel with the best-placed sensor, while the two other channels are only provided for the purpose of detecting the lateral movement of the trigger mark 9 by using the frequency statistics previously explained, in order if required to displace the selected group of three sensors 1 laterally by changing over the multiplexers 18A, 18B and 18C, to track the lateral shifting of trigger mark 9.

In order to track the selected sensor group $S_{k-1}$, $S_k$, $S_{k+1}$, various modifications to the method described previously are conceivable. For example, a switching could also be made when one of the two sensors $S_{k-1}$ or $S_{k+1}$ adjacent to the currently best sensor $S_k$ has no longer detected the trigger mark 9 at all within a predetermined number of revolutions of the roller 5, since then it is probable that no further detection by this sensor is to be expected. In this case, a displacement in time of the output of the detection signal from the central channel to one of the outer channels may also be expedient if, of the three sensors that are currently connected through, the central one in the frequency statistics has not yet reached the highest frequency.

By using the frequency statistics of the detections of the trigger mark 9, faults, such as local contamination of the sensor arrangement 1 or of the imaging optics 2, or a faulty print of the trigger mark 9 as a result of local damage or contamination of the printing unit used for this, can be determined. For instance, it would be a clear indication of such a fault if only a single sensor $S_k$ were to detect the trigger mark 9, or if two non-adjacent sensors $S_{k-1}$ and $S_{k+1}$ detect the trigger mark 9 sporadically while it is not detected by the sensor $S_k$ located in between. A further example of a fault situation would be a movement of the frequency maximum of the detection of the trigger mark 9 to one of the ends of the sensor arrangement 1, i.e., to the sensor $S_1$ or to the sensor $S_N$. In such cases, the evaluation unit 17 outputs a fault message via the data line 15 to a higher-order control device, which draws the attention of the operating personnel of the press by means of an appropriate display on an operating console.

Although in principle an integrated line sensor can also be used for the sensor arrangement 1, it is preferred to avoid the necessity for a reducing projection of the observation strip 3 onto the sensor arrangement, in order to manage with the simplest possible imaging optics 2. To this extent, an implementation with discrete photodiodes on a printed circuit board appears to be a particularly simple and economical solution.

The invention is not just suitable for the detection of a single repeating trigger mark 9 on the printed product 4. Instead, a plurality of different signal patterns could also be predefined to the microcontroller 23, corresponding to respectively different trigger marks 9 printed on the printed product 4 at a distance from one another, and their occurrence could be indicated selectively by the evaluation unit 17 by means of respective detection signals on a plurality of different trigger lines 12.

The invention is also suitable for the application for determinations of register, such as cut register, for circumferential and lateral registering, with corresponding usable sensor arrangements.

What is claimed is:

1. An apparatus for detecting a predetermined pattern on a moving printed product, comprising:

an optoelectronic sensor having a plurality of sensor elements in a linear arrangement and directed to the moving printed product;

an evaluation unit; and a switching device connected to the optoelectronic sensor for connecting a selectable subset of the sensor elements to the evaluation unit, wherein the switching device includes a plurality of multiplexers each being connected to a corresponding sensor element in the selectable subset, the evaluation unit processing output signals generated by sensing elements in the selectable subset to determine an occurrence of the predetermined pattern on the moving printed product.

2. An apparatus as in claim 1, wherein the evaluation unit has a clock signal input for receiving an external clock signal having a rate correlated to a moving speed of the moving printed product, and wherein the evaluation unit processes the output signals of the sensor elements in the selectable subset according to the external clock signal.

3. An apparatus as in claim 1, wherein the sensor elements in the selectable subset form a contiguous section in the linear arrangement.

4. An apparatus as in claim 1, wherein the selectable subset consists of three consecutive sensor elements in the linear arrangement.

5. An apparatus as in claim 1, wherein the evaluation unit has an analog/digital converter having a plurality of channels each assigned to a corresponding one of the multiplexers for receiving an output signal of a corresponding sensor element in the selectable subset.

6. An apparatus as in claim 5, wherein the evaluation unit includes a signal memory connected to the analog/digital converter such that data representing output signals of the sensor elements digitized by the analog/digital converter are continuously written into the signal memory.

7. An apparatus as in claim 6, wherein the evaluation unit has a microcontroller programmed to compare data in the signal memory with a stored signal pattern, and to generate a detection signal when the data in the signal memory matches the stored signal pattern.

8. An apparatus as in claim 6, wherein the signal memory is supplied with an external clock signal received by the evaluation unit such that an amount of data written into the signal memory per unit time is proportional to a rate of the external clock signal.

9. An apparatus as in claim 1, further including a light source with a substantially linear illumination region arranged relative to the linear arrangement of the sensor elements such that the illumination region completely covers an observation region of the optoelectronic sensor in a longitudinal direction of said observation region.

10. An apparatus as in claim 1, wherein the evaluation unit has a connection to a data line, and the evaluation unit is programmed to receive a transmitted signal pattern via the data line and to store the transmitted signal pattern as a stored signal pattern.

11. A method for detecting a predetermined pattern on a moving printed product, comprising:

providing a plurality of sensor elements in a linear arrangement and directed to the moving printed product;

selecting a subset of sensor elements from the plurality of sensor elements, wherein the step of selecting the subset of sensor elements includes:

checking output signals of sensor elements in the linear arrangement in a predetermined order for occurrences of a detected signal pattern that matches the stored signal pattern; and adding sensor elements whose output signals contain the detected signal pattern to the subset;

continuously monitoring output signals from the sensor elements in the selected subset;

determining whether an output signal of a selected sensor element in the subset contains a detected signal pattern that matches a stored signal pattern;

generating a detection signal if the output signal of the selected sensor element in the subset contains a detected signal pattern that matches a stored signal pattern; and changing a composition of the sensor elements in the subset when predetermined changes have occurred in the output signals from the sensor elements in the subset.

12. A method as in claim 11, wherein the step of checking includes:

identifying a first sensor element whose output signal contains the detected signal pattern; and analyzing an output signal of a second sensor element adjacent the first sensor element to determine whether the output signal of the second sensor element contains the detected signal pattern.

13. A method as in claim 11, wherein the step of selecting selects three sensor elements for the subset.

14. A method as in claim 11, further including:

generating a frequency statistic of occurrences of the detected signal pattern in the output signals of the sensor elements in the subset; and designating one sensor element in the subset as the selected sensor element, wherein the step of generating the detection signal is based on an occurrence of the detected signal pattern in the output signal of the selected sensor element.

15. A method as in claim 11, further including:

generating a frequency statistic of occurrences of the detected signal pattern in the output signals of the sensor elements in the subset; and when a sensor element at a first edge of the subset has a highest frequency of occurrence of the detected signal pattern, modifying the subset by removing a sensor element at a second edge of the subset from the subset and adding a sensor element adjacent the sensor element at the first edge to the subset.

16. A method as in claim 11, further including:

generating a frequency statistic of occurrences of the detected signal pattern in the output signals of the sensor elements in the subset; and when a sensor element at a first edge of the subset exhibits a frequency of occurrence of the detected signal pattern that is lower than a pre-selected threshold, modifying the subset by removing the sensor element at the first edge from the subset and adding a sensor element that is adjacent to a sensor element at a second edge of the subset to the subset.

17. A method as in claim 16, wherein the step of generating the frequency statistic of occurrences of the detected signal pattern correlates a number of occurrences of the detected signal pattern in the output signal of each of the sensor elements in the subset with a pre-determined movement distance of the printed product.

18. A method as in claim 11, wherein the step of determining includes identifying in the output signal of said selected sensor element of the subset a first signal edge of a predetermined minimum height between a high level and a low level with respective predetermined minimum lengths.

19. A method as in claim 18, including the step of calculating from the high and low levels a threshold for identifying subsequent edges in the output signal of said selected sensor element of the subset.

20. A method as in claim 18, wherein the step of determining includes identifying a predetermined sequence of signal edges following the first signal edge.

21. A method as in claim 18, wherein the step of generating the detection signal uses a signal edge following a last signal edge in the predetermined sequence as a timing reference for outputting the detection signal.

22. A method as in claim 11, wherein the step of determining checks the output signal of the selected sensor element in the subset immediately after receiving said output signal for the occurrence of the detected signal pattern and checks output signals of other sensor elements in the subset after a time offset.

23. A method as in claim 11, including deriving a data rate of the output signals of the sensor elements in the subset from a clock signal with a frequency proportional to a speed of movement of the printed product.

* * * * *